(12) United States Patent
Kim et al.

(10) Patent No.: US 6,192,180 B1
(45) Date of Patent: Feb. 20, 2001

(54) TRAY FOR SPLICING OPTICAL RIBBON FIBERS

(75) Inventors: Geun Young Kim; Jeong Gyun Ahn; Chang Ha Kim, all of Kyoungki-Do (KR)

(73) Assignee: Korea Telecom, Sungnam-si (KR)

( * ) Notice: Under 35 U.S.C. 154(b), the term of this patent shall be extended for 0 days.

(21) Appl. No.: 09/203,479

(22) Filed: Dec. 2, 1998

(30) Foreign Application Priority Data

Dec. 2, 1997 (KR) .................................................. 97-65322

(51) Int. Cl.[7] ....................................................... G02B 6/36
(52) U.S. Cl. ............................................................. 385/135
(58) Field of Search .................................. 385/135, 134, 385/136, 137

(56) References Cited

U.S. PATENT DOCUMENTS

| | | | | |
|---|---|---|---|---|
| 5,479,553 | * | 12/1995 | Daems et al. ........................ | 358/135 |
| 5,835,657 | * | 11/1998 | Suarez et al. ........................ | 385/135 |
| 5,884,003 | * | 3/1999 | Cloud et al. ......................... | 385/135 |
| 5,887,106 | * | 3/1999 | Cheeseman et al. ................ | 385/135 |

* cited by examiner

*Primary Examiner*—Frank G. Font
*Assistant Examiner*—Andrew H. Lee
(74) *Attorney, Agent, or Firm*—Staas & Halsey (57) ABSTRACT

A tray for splicing optical ribbon fibers capable of storing and organizing ribbon fibers splices and excess length, improving accommodation density for the optical ribbon fiber by using new splice arrangement plate structure, including a tray main body having a plurality of supporting portions protruded on an outer side thereof; a plurality of inlet portions for providing inlet paths for protection tubes, each of the inlet portions being formed on the outer side; a pair of stacking bars having through holes rotatably supported by one of the supporting portions to stack another tray main body; a plurality of splice arrangement plates for organizing optical ribbon fibers, each of the splice arrangement plates being disposed on the main body; a number of organizing portions for fixing the optical ribbon fibers and arranging excess lengths of the optical ribbon fibers, each of said splice arrangement plates comprising a plurality of the organizing portions; and a plurality of covers for covering the splice arrangement plates, respectively, to prevent said splice and excess length positioned in organizing portions from being removed outward.

15 Claims, 8 Drawing Sheets

TRAY FOR SPLICING OPTICAL RIBBON FIBERS

BACKGROUND OF THE INVENTION

1. Field of the Invention

The present invention relates to a tray for storing and organizing optical ribbon fiber splices and an excess length of the optical ribbon fiber easily. More particularly, it relates to a tray for splicing optical ribbon fibers capable of holding firmly splices used in the splicing between the optical ribbon fibers consisting of multifiber (i.e., 4 to 12 cores), improving accommodation density for the optical ribbon fiber splices and excess length by using the new splice arrangement plate structure.

2. Description of Related Art

Generally, as a result of spread of the high-speed broadband telecommunication, when optical lines are supplied to all homes, many optical fibers are required as well as the copper lines. Therefore, when it is intended to construct subscriber lines by means of the optical cable, an optical ribbon cable which is made of a plurality of optical fibers has been developed and used. The optical ribbon cable is manufactured by a plurality of cores in a single body, so that a volume of the optical cable can be minimized and a plurality of cores can be integrated. Presently, the optical ribbon fiber made of optical fiber having 4 cores, 8 cores or 12 cores is used. Further, a plurality of splicing points and connecting points are required so that the the optical ribbon fiber cable is supplied to specific position.

In this case, since a splicing point affects performance and a degree of the reliance for all optical telecommunication lines, the splicing point should be protected from an extraneous mechanical shock perfectly. Further, the excess length of the optical fiber used in the splicing should be arranged to distinguish from each other easily so that a re-splicing or repair work for the excess length is convenient, and be stored securely.

Therefore, the tray is indispensable for protecting the splices and storing the excess length. By the way, in case the optical ribbon fiber, since sizes and shapes of fibers, a method of fixing the splice, and a method of arranging the excess length are different from those in a single optical fiber, there is a problem that the tray for the single optical fiber cannot be used for the optical ribbon fiber as it is. Therefore, there is needed a new product which adapts a method of storing and organizing the optical ribbon fiber splices and the excess length according to a new aspect. Further, since most of the splicing works are accomplished in a small space such as a man-hole, the splicing products need to be minimized fit in a small space. Furthermore, since the entire size of the splicing products depends on an accommodation ability of the splices, the tray needs to be minimized and a plurality of splice portions needs to be accommodated in the tray at a high density.

Most of the trays for storing and organizing optical ribbon fiber splices according to the prior art are made by modifying partially of the tray for a single optical fiber.

However, since the optical ribbon fibers have width and length different from each other, it is difficult to fix the splice and arrange the excess length in a single plane. Particularly, it is very difficult to access separately the specific optical ribbon fiber if repair is needed.

U.S. Pat. No. 5,323,480 entitled "Fiber Optical Splice Closure" discloses a structure capable of accommodating the optical ribbon fiber as well as a single optical fiber. In this case, since arrangement work of the excess length of the optical ribbon fiber should be performed in a single plane, when a plurality of optical ribbon fibers having a long or short excess length are made by re-splicing work, there is a problem that the excess length is twisted and the arrangement of the excess length cannot be neatly accomplished. Further, since the accommodation density of the splice and excess length is diminished, a plurality of spliced portions cannot be accommodated.

U.S. Pat. No. 5,278,933 entitled "Fiber Optic splice Organizer and Associated Method" discloses an apparatus capable of arranging a splice of the optical ribbon fiber three-dimensionally. However, since a large portion of a space for arranging the excess length isn't utilized, a degree of the space utility degrades. Even though only one optical ribbon fiber should be re-spliced, the operator should untie all excess length of optical ribbon fiber accommodated in the apparatus. Further, the number of the splice accommodated in a tray is limited to a method applied to arrangement of the excess length, and it is difficult to accommodate a plurality of the trays in an splice closure because a volume of a tray is large.

A few publications published in Japan (i.e., A New Optical Slack Fiber Accommodation Block For 800-Fiber Fusion Splices, The Transaction of the IECE of Japan. Vol. E 69, No. 4 April 1986 p360, and A New High-Density Cylindrical Accommodation Block for a Large Number of Optical Fiber Splices, The Transaction of the IECE of Japan. Vol. E69, No. 4 April 1986 p363) disclose apparatus capable of improving accommodation density by using a plastic sheet instead of the tray. In these cases, a plurality of the splices and the excess length are attached to the plastic sheet by an adhesive tape.

However, since a plurality of the plastic sheets are stacked, when an operator works on a splice which is attached to a specified sheet positioned in a middle portion, it is difficult for an operator to access to the objective splice. Furthermore, since a sheet-shaped plastic is used as the tray for supporting-protecting optical fiber, there is a problem that the splice portion and the optical ribbon fiber cannot be protected from an extraneous vibration and shock completely.

SUMMARY OF THE INVENTION

It is, therefore, an object of the present invention to provide a tray for splicing optical ribbon fibers capable of maximizing an accommodation density for a splice of the optical ribbon fiber and an excess length, and performing easily a various work correlating to the splice and the excess length.

In order to accomplish the above object, a tray for splicing optical ribbon fibers according to the present invention comprises: a tray main body having a plurality of supporting portions protruded on an outer side thereof; a plurality of inlet portions which provide inlet paths for protection tubes, each of the inlet portions being formed on an outer side of the tray main body; a pair of stacking bars having a through hole supported rotatably by one of the supporting portions of another tray main body rotatably in order to stack a plurality of the tray main bodies; a plurality of splice arrangement plates which organize optical ribbon fibers, each of the splice arrangement plates being disposed on the tray main body; a number of organizing portions which fix the optical ribbon fibers and arrange excess length of the optical ribbon fibers each splice arrangement plate comprising a plurality of the organizing portions, and a plurality of cover which cover the splice arrangement plates, respectively to prevent the splice and excess length positioned in the organizing portions from being removed outward.

BRIEF DESCRIPTION OF THE ATTACHED DRAWINGS

Other features in structure, operation and advantages of the present invention will become more apparent to those skilled in the art from the following descriptions when read in conjunction with the accompanying drawings, in which.

DETAILED DESCRIPTIONS OF A PREFERRED EMBODIMENT

Hereinafter, the embodiment according to the present invention will be described in detail, referring to the drawings.

Figure 1:
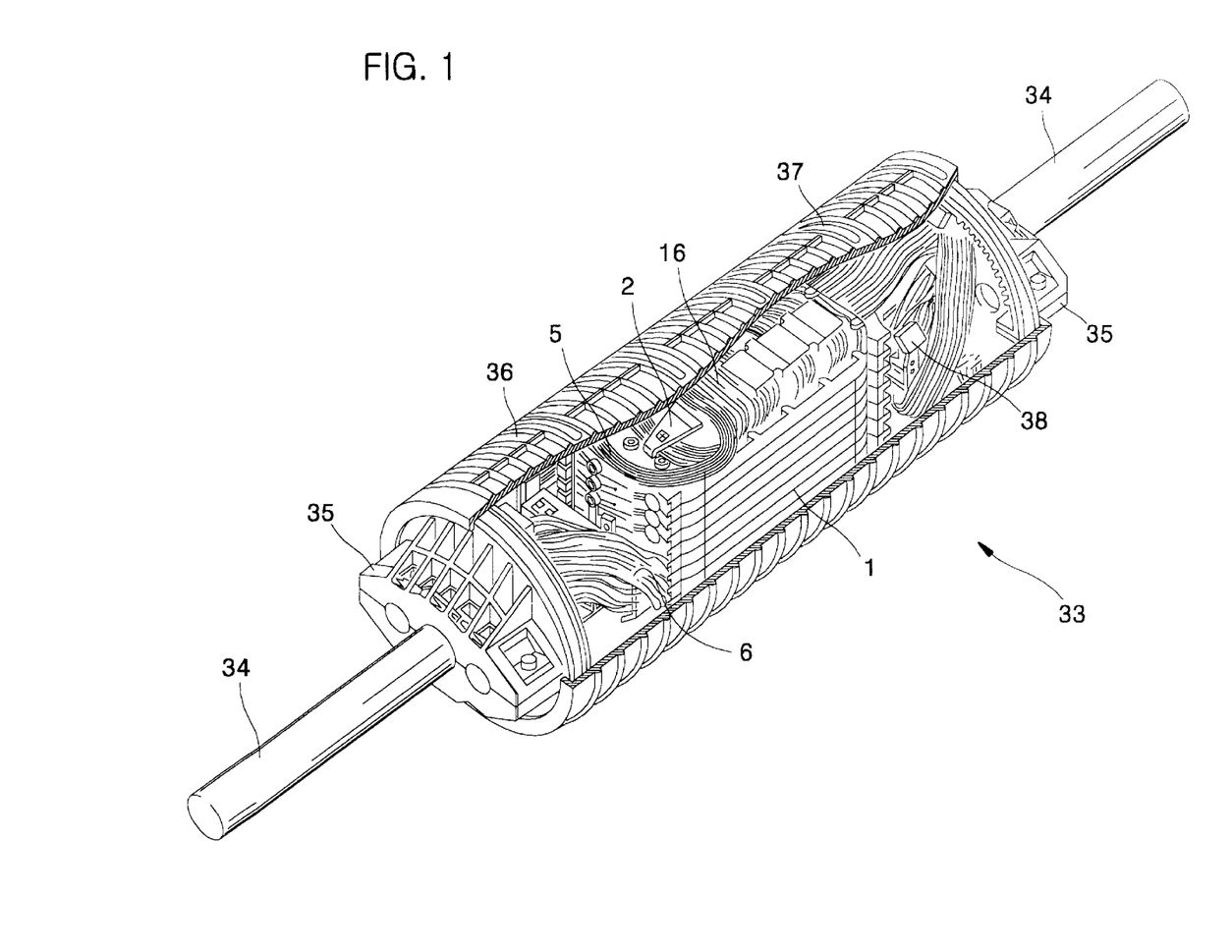
FIG. 1 is a perspective view showing an splice closure for optical ribbon fiber cable disposing trays for splicing optical ribbon fibers according to the present invention, with a part of portion cut off partially.

FIG. 1 is a perspective view showing an splice closure for optical ribbon fiber cable disposing trays for splicing optical ribbon fibers according to the present invention, with a part cut off.

As shown in FIG. 1, the optical ribbon fiber cables 34 are inserted into an splice closure 33 through each endcap 35 positioned in both ends of the splice closure 33. Further, the splice closure 33 has a plurality of trays for containing and protecting the optical ribbon fibers and splices therein. In this case, the tray main body 1 is positioned between the both endcaps 35, and then be fixed by a tension member holder 38 and a clamping bar firmly. The optical ribbon fiber cables 34 inserted in the splice closure 33 are stripped off their sheathes, and then their tension members are fixed in the tension member holder 38. In this case, the optical ribbon fiber 5 is inserted into a protection tube 6 and be transferred to the tray main body 1, so that a splicing work of the optical ribbon fibers 5 and a storing work of an excess length can be performed. After the works are completed, the upper and lower portions of the endcaps 35 are covered with outer housings 36. Then, the outer housings 36 are fastened and sealed with six bands 37. The splice closure 33 which is completely assembled is disposed in a manhole.

Figure 2:
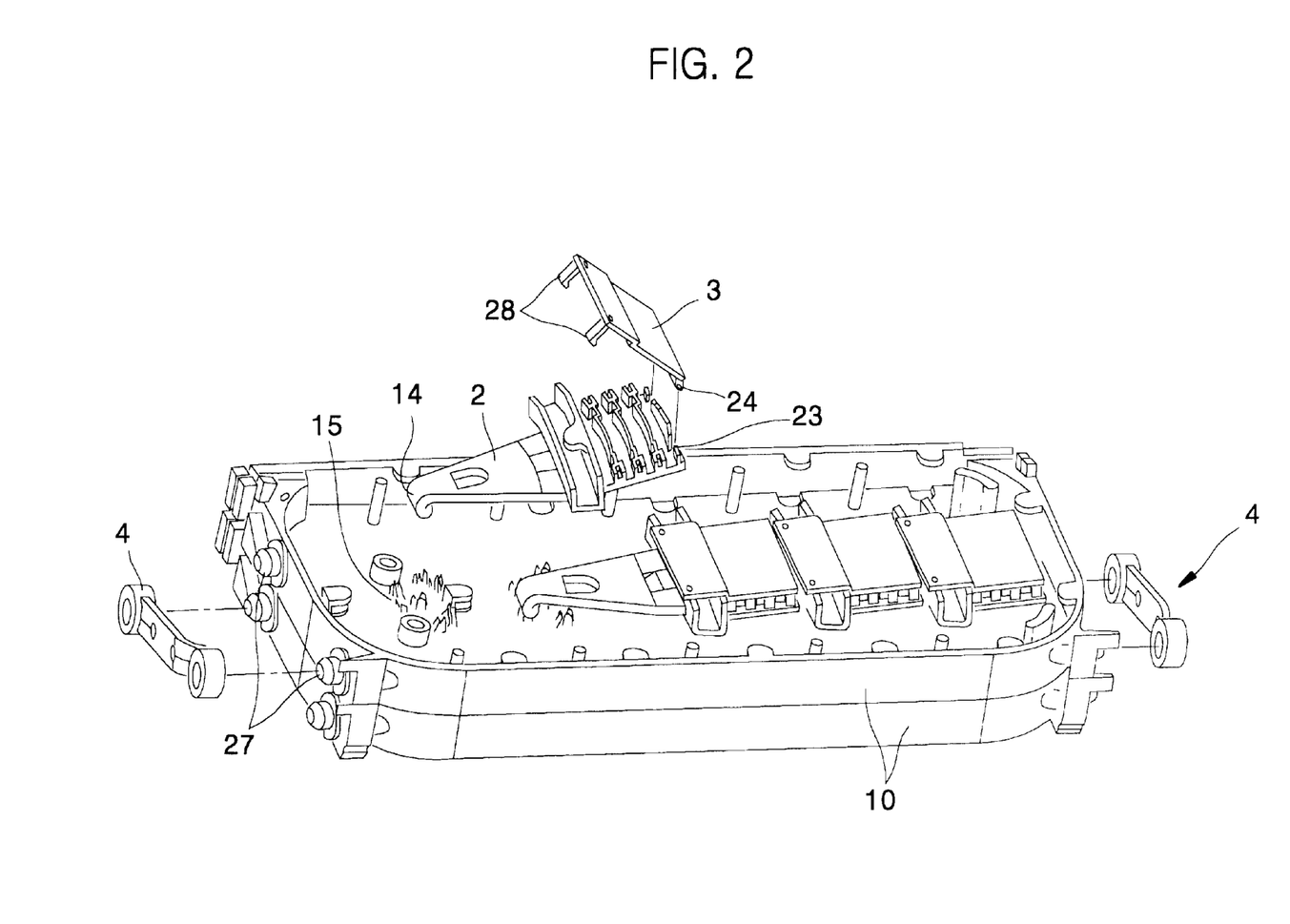
FIG. 2 is a perspective view showing a assembly of tray according to the present invention.
Figure 3:
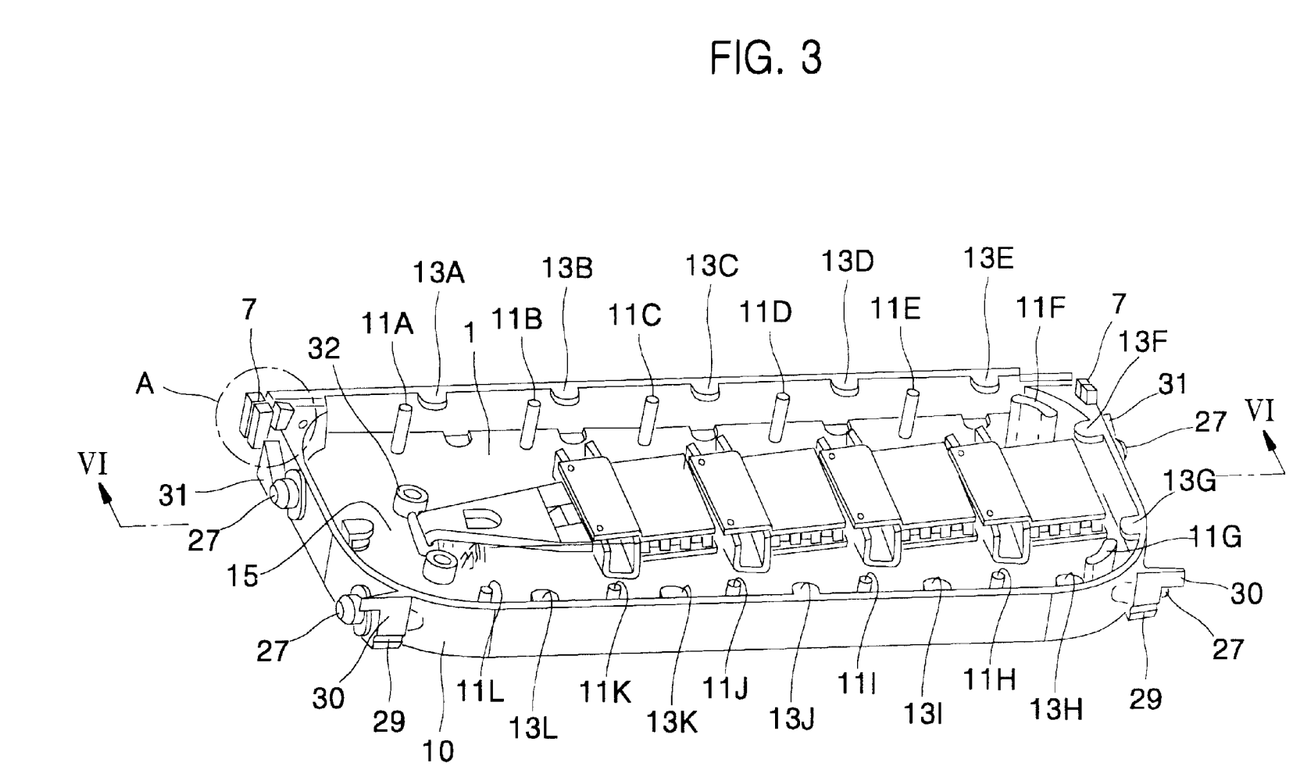
FIG. 3 is a perspective view showing a disassembly of the tray according to the present invention.
Figure 4:
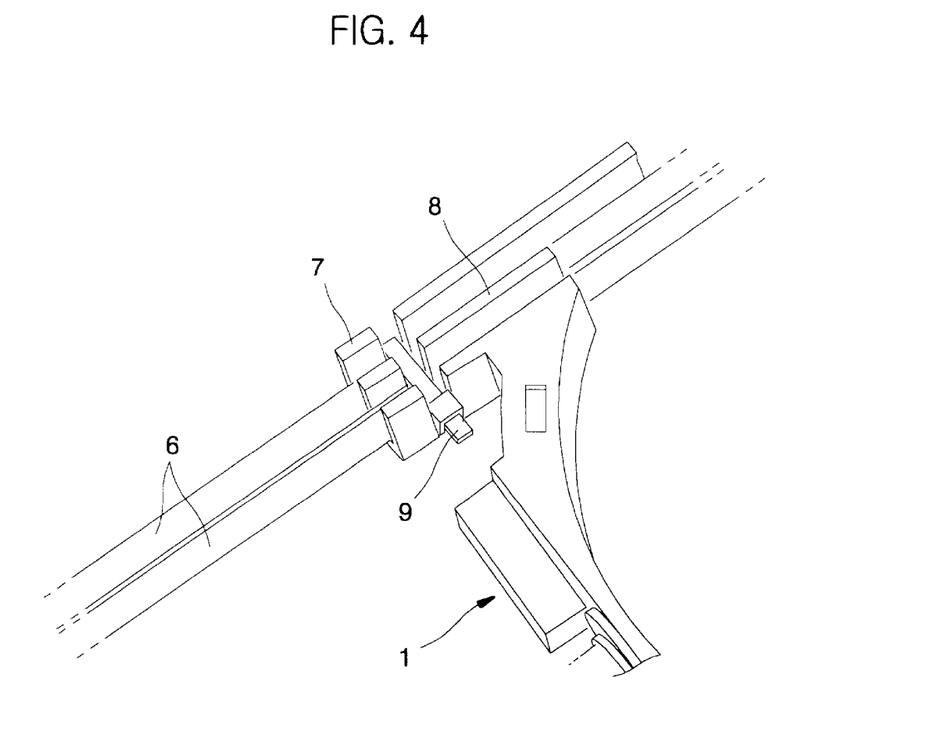
FIG. 4 is a perspective view enlarging "A" portion of the FIG. 3.

FIG. 2 is a perspective view showing an assembly of tray for splicing optical ribbon fibers according to the present invention, FIG. 3 is a perspective view showing a disassembly of the tray, and FIG. 4 is a perspective view enlarging "A" portion of FIG. 3.

As shown in FIGS. 2 and 3, the tray main body 1 has four splice arrangement plates 2 for fixing splices, and four covers 3 for covering the each splice arrangement plate 2. Further, the tray main body 1 has a pair of stacking bars 4 for holding it in right and left sides so that other tray main bodies 1 can be stacked successively on top of the tray main body 1, and a pair of inlet portions 7 for providing the inlet paths for protection tube 6 on outer side thereof. Each of the stacking bars 4 has a through hole on each end portion thereof. Furthermore, each of the tray main bodies 1 has a plurality of guide bars "11A~11L" for guiding the protection tube 6 on a bottom surface thereof, and a plurality of protrusions "13A~13L" for preventing the protection tube 6 from being removed outward on an inner wall thereof. In this case, the guide bars "11A~11L" and the protrusions "13A~3L" are spaced out a certain distance each other and, the guide bars 11A~11L" are arranged between the protrusions "13A~13L".

In the embodiment, the protection tube 6 includes four optical ribbon fibers 5 therein and is fixed firmly in the inlet portion 7 in order to transferred the optical ribbon fibers 5 inside the tray main body 1 and firmly fined in the inlet portion 7. Further, as shown in FIG. 4, the inlet portion 7 has a separator 8 for dividing an inlet path into two sections. In this case, two protection tubes 6 can be inserted into the each inlet path with them stacked in the two layers, and the inserted protection tubes 6 are fastened by a buckle 9 for preventing them from being removed outward. Therefore, four protection tubes 6 in the inlet portion 7 can be fixed, and then the tray main body 1 accommodates sixteen splicers 18.

Of each of the protection tubes 6 is inserted in the tray main body 1, the guided to a splice position by guide bars "11A~11L" running parallel with an outer wall 10 of the tray main body 1, with their allowance curvature remained. Further, which the protection tubes 6 are moved to the splice position, the movement of the protection tubes 6 is limited by the protrusions "13A~13L" to prevent them from being removed ourward.

Figure 5:
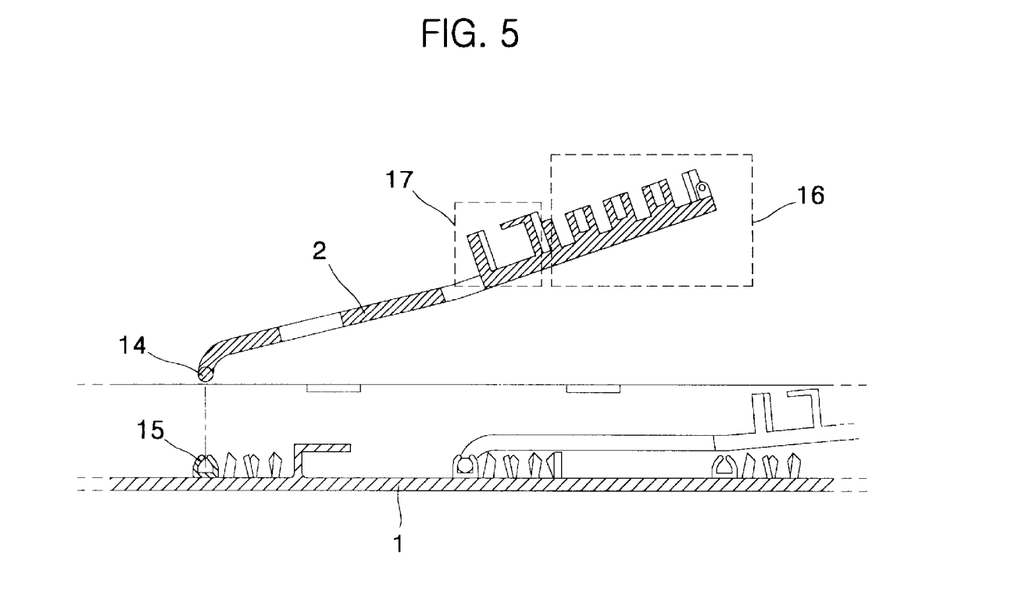
FIG. 5 is a longitudinal cross-sectional view showing an assembly of the tray main body and an splice arrangement plate of the tray according to the present invention.
Figure 6:
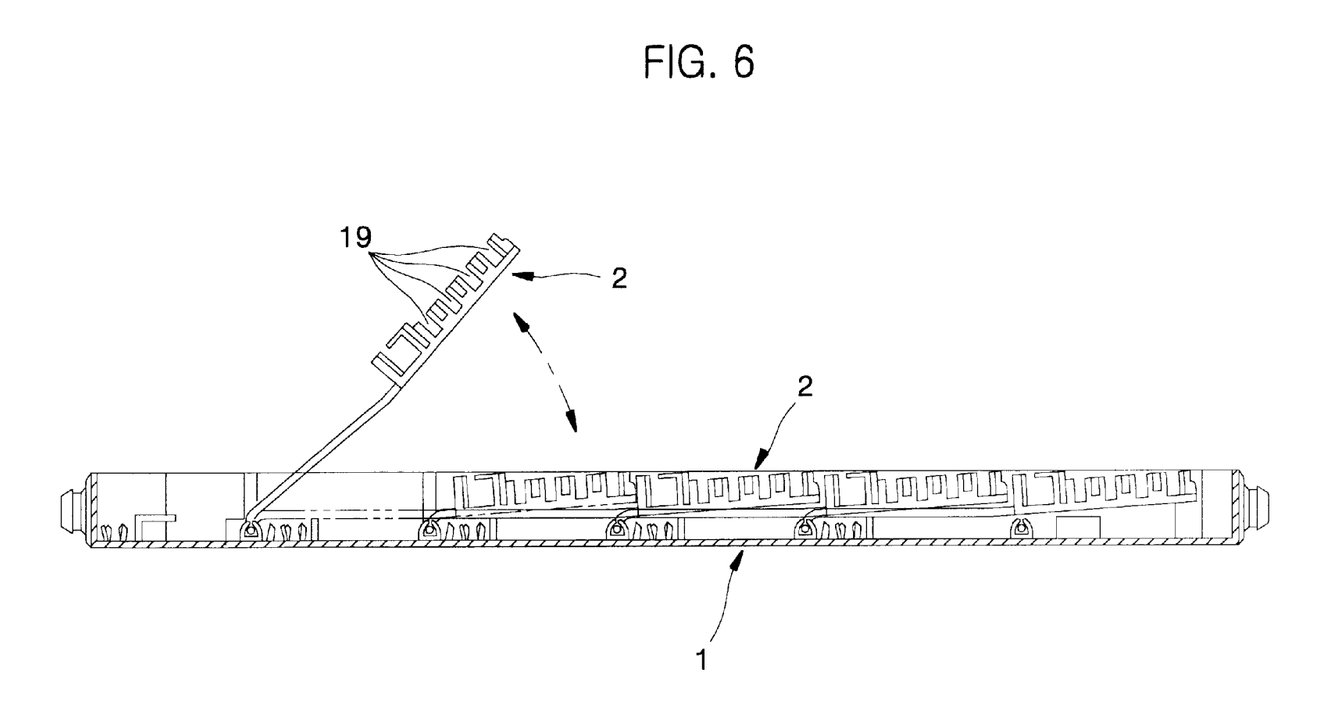
FIG. 6 is a longitudinal cross-sectional view taken along line VI—VI of the FIG. 3.

FIG. 5 is a longitudinal cross-sectional view showing an assembly of the tray main body 1 and the splice arrangement plate of the tray according to the present invention, and FIG. 6 is a longitudinal cross-sectional view taken along line VI—VI of FIG. 3.

As shown in FIG. 5, the splice arrangement plate 2 has extended portions 14 having a circular section in front thereof, and the extended portions 14 are rotatably fitted into claws 15 formed on center portion of the tray main body 1. Therefore, when the splice arrangement plate 2 is assembled in the tray main body 1, the splice arrangement plate 2 can be freely rotated in the upward or downward direction.

In the embodiment, as shown in FIG. 6, the four splice arrangement plates 2 are assembled in a single tray main body 1, in which the four splice arrangement plates 2 are arranged in order to keep a predetermined angle against a bottom surface of the tray main body 1. Therefore, an accommodation density of the splices and excess length is high, and the excess length of the each optical ribbon fiber can be distinguished from each other clearly so that an operator can easily work.

Therefore, since a splice arrangement plate 2 positioned in the front is rested on a splice arrangement plate 2 positioned next thereto, when work is needed for the splice arrangement plate 2 positioned in the lower part, a working space can be obtained by lifting the splice arrangement plate 2 positioned in the upper part.

Figure 7:
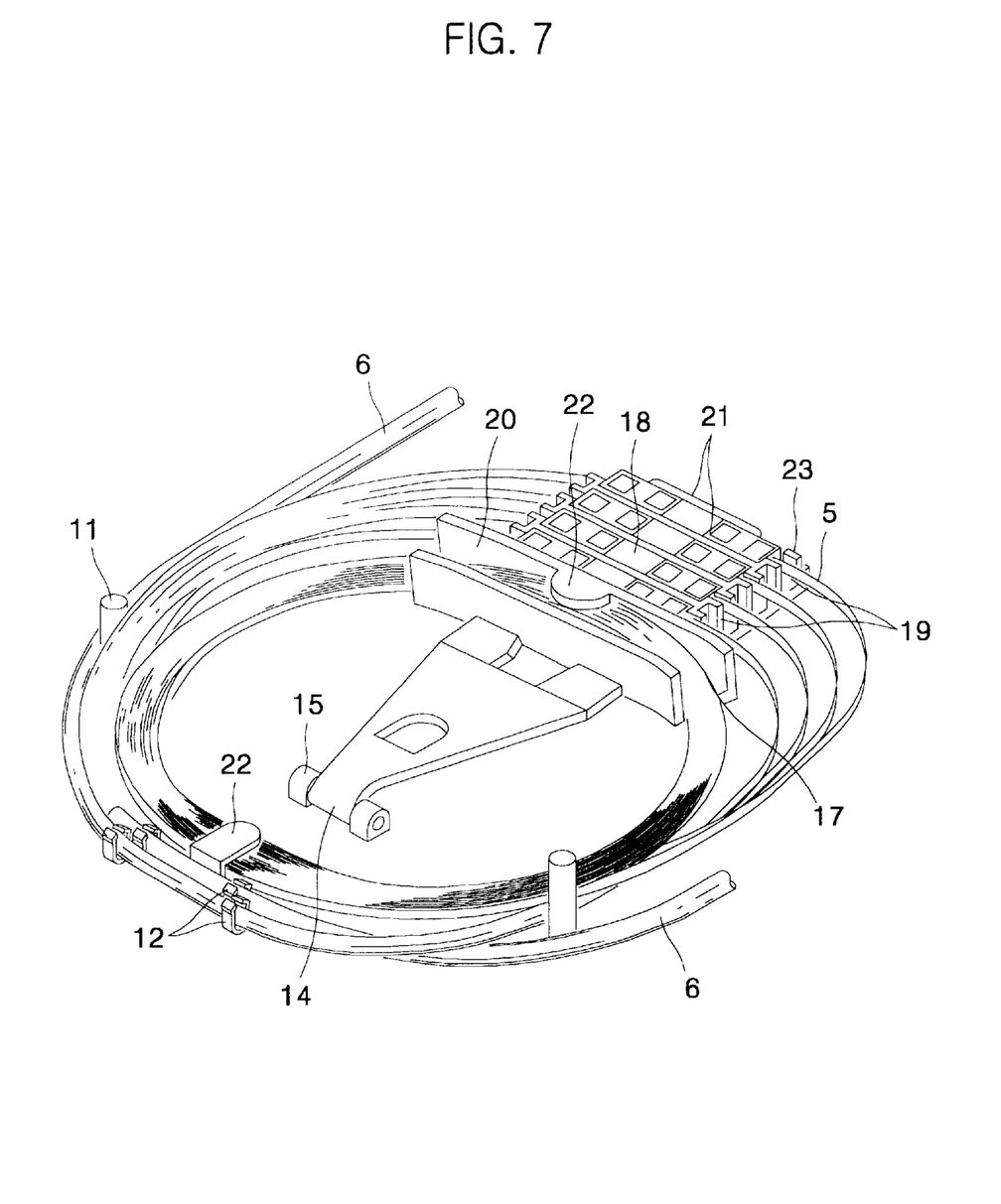
FIG. 7 is a perspective view showing a splice arrangement plate for the optical ribbon fiber splice according to the present invention.
Figure 8:
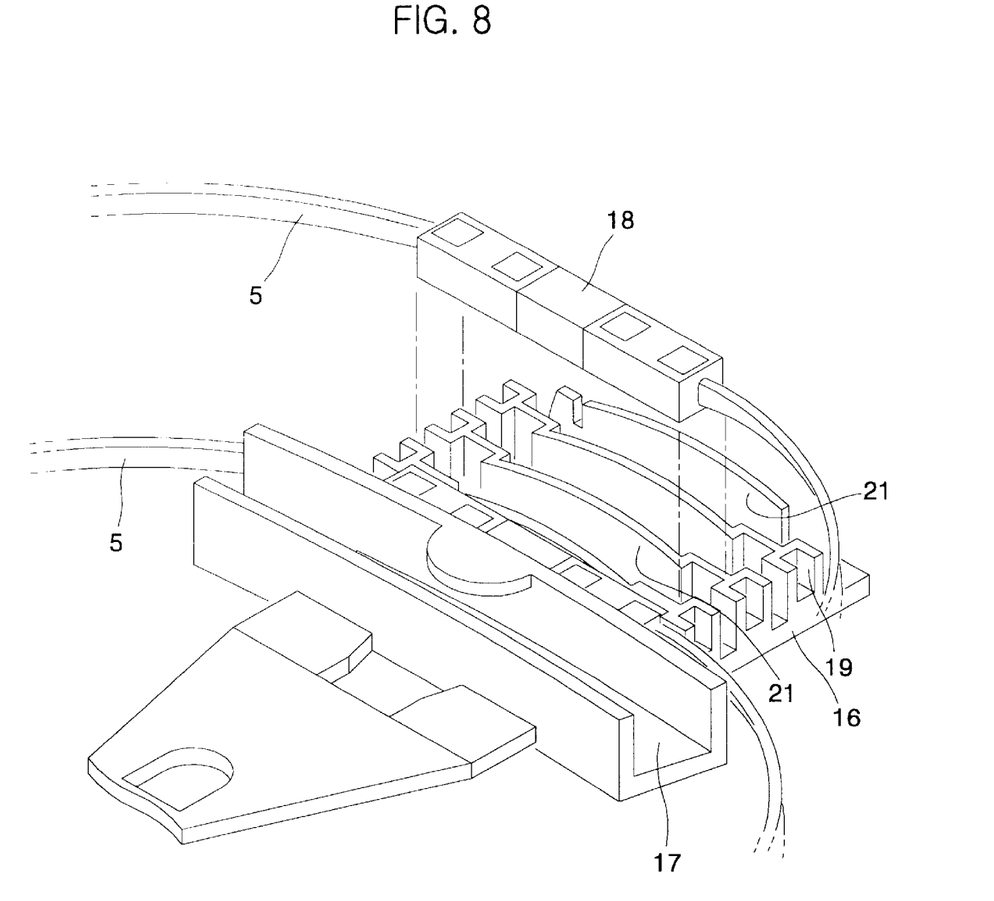
FIG. 8 is a perspective view enlarging a retaining portion in the splice arrangement plate of the FIG. 7.

FIG. 7 is a perspective view showing the splice arrangement plate for the optical ribbon fiber splice according to the present invention, and FIG. 8 is a perspective view enlarging a retaining portion in the splice arrangement plate partially. As shown in FIG. 7, the splice arrangement plate 2 comprises of a plurality of organizing means 19 comprising a retaining portion 16 for fixing the splice and an excess length arranging portion 17 for arranging excess length. The optical ribbon fibers 5 contained in the protection tubes 6 are transferred to the supporter 12 positioned in the front of an objective splice arrangement plate 2 requiring specified work in the tray main body 1, and then be fixed. In this case, the optical ribbon fibers 5 protruded from the protection tubes 6 are spliced in the splice 18. After the splice of the protruded optical ribbon fibers 5 is completed, the splices 18 are fitted into the retaining portions 16.

Each splice arrangement plate 2 has a plurality of organizing means 19 for fixing a plurality of the splices 18 (see FIG. 6). Further, as shown in FIGS. 7 and 8, the organizing means 19 fixes the splice 18 fitted between a bendable bow-shaped plate 21 and a wall 20 positioned in front of the plate 21. Furthermore, the bow-shaped plate 21 is designed in consideration of curvature and shape capable of fitting the various shaped splices 18. After the splices 18 are fitted between the bow-shaped plate 21 and the wall 20, the excess length of the optical ribbon fiber is wounded and stored in the excess length arranging portion 17 for arranging the excess length without getting twisted. In this case, the wall 20 makes the stored excess length held at or more than its allowance curvature. Further, the wall 20 has a protruded portion 22 on an upper end thereof, so that the protruded portion 22 prevents the stored excess length from being removed in its position.

Figure 9:
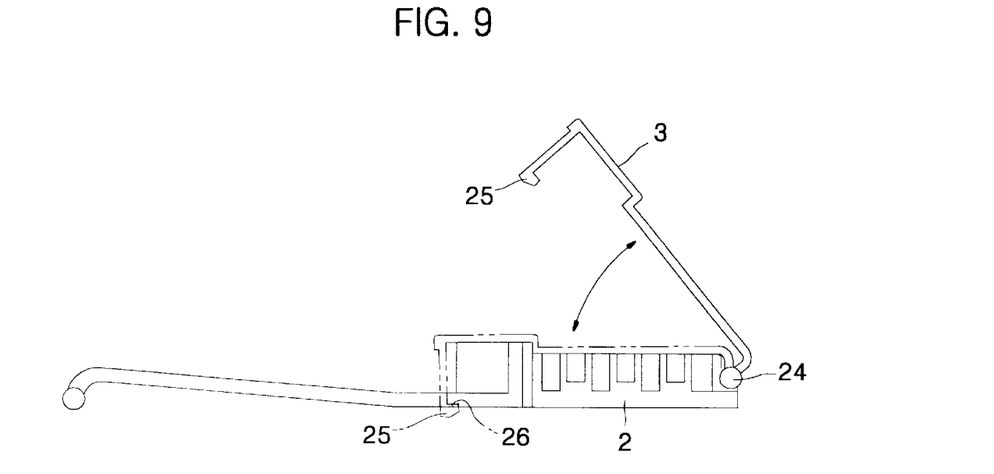
FIG. 9 is a side view showing an assembly of a cover for the splice arrangement plate of the tray according to the present invention.

FIG. 9 is a side view showing an assembly of a cover for the splice arrangement plate according to the present invention. The cover 3 can cover all the retaining portions 16 and the excess length arranging portion 17 to protect the splice 18 fixed in the retaining portion 16 and the excess length stored in the excess length arranging portion 17 from being removed outward by the extraneous shocking vibration and so on. Furthermore, the cover 3 has a cover hinge 24 on a rear end portion thereof, and the cover hinge 24 is rotatably joined into a cover rotation portion 23 formed in the splice arrangement plate 2. Therefore, when the cover hinge 24 is joined in the cover rotation center portion 23, the cover 3 can be rotated in the upward and downward direction. The cover 3 has a cover hook 25 in a front end thereof. When the retaining portion 16 and the excess length arranging portion 17 are perfectly covered, according to a rotation of the cover 3, the cover hook 25 is latched onto a projection 26 formed in a lower surface of the excess length arranging portion 17.

Figure 10:
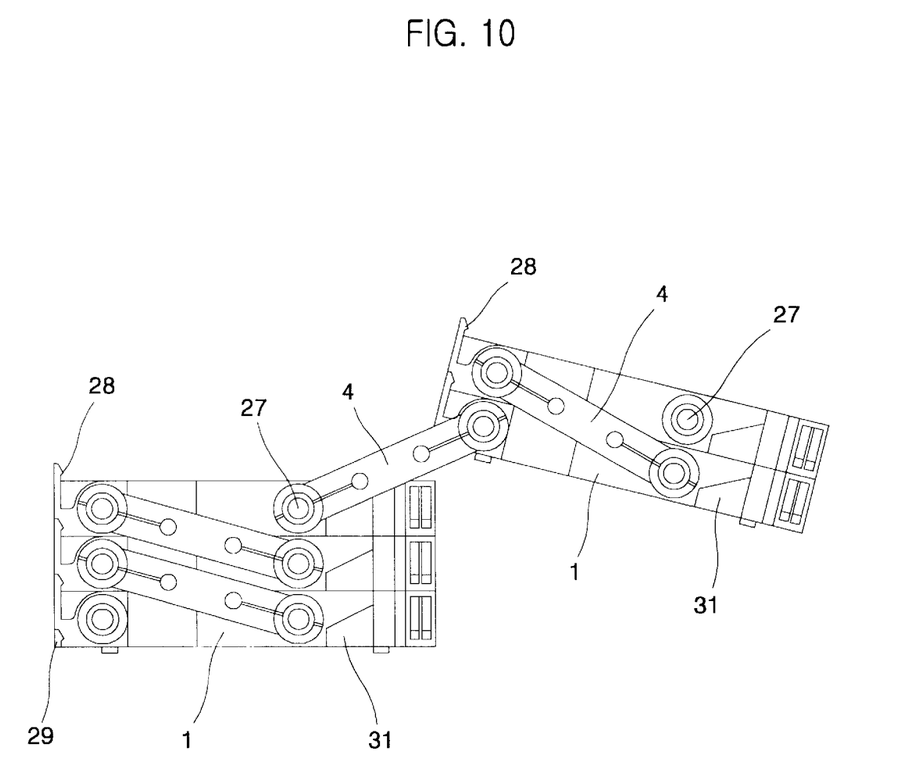
FIG. 10 is a side view showing the stacking bar for stacking a plurality of trays according to the present invention.

FIG. 10 is a side view showing the stacking bar for stacking a plurality of trays according to the present invention. The tray main body 1 has a pair of supporting portions 27 inserted in the through hole of the stacking bar 4 in both sides thereof so as to support rotatably the stacking bar 4 in both sides thereof, a tray main body hook 28 on an upper surface of an end portion thereof, and a recess 29 for fitting the tray main body hook 28 on a lower surface of the end portion thereof. In this case, two tray main bodies 1 positioned closely in an upper and lower arrangement can be connected to the supporting portion 27 by joining the stacking bar 4. As above-mentioned, a plurality of the tray main bodies 1 can be stacked in order to correspond to the number of core of optical ribbon fibers accommodated therein. Therefore, since a tray main body 1 can be lifted and lowered by rotation of the stacking bar 4 with it connected with the other tray main body, although the tray main body 1 requiring specified work is located in the lower part, an operator can easily access to the objective tray main body 1 by lifting all the tray main bodies positioned above the objective tray main body. Therefore, when the operator would like to lift the tray main body 1 positioned in an upper portion, the operator can remove the tray main body hook 28 from the recess 29 by pulling forwardly the hook handle 30 formed on the both sides of the tray main body l(see FIG. 3).

Furthermore, the tray main body 1 has a pair of stoppers 31 for limiting rotation of the stacking bar 4 on the outer sides thereof. Therefore, when the operator lifts the tray main body positioned above the objective tray main body in order to perform work such as re-splicing and so on, the stacking bar 4 is rotated by a predetermined angle, and then is suspended by the stoppers 31. Then, the working surface of the objective tray main body appears outwardly. Further, the tray main body 1 has four body fixing portions 32 capable of fastening a bolt on a bottom surface. Therefore, the tray main body 1 is fixed to outer housing of the splice closure by fastening a bolt and nut to the body fixing portion 32 firmly.

As the above mentioned, a tray for interconnecting optical ribbon fibers according to the present invention can maximize an accommodation density of the splice and the excess length, and perform splicing and arranging work of the excess length easily.

Further, as a result of this, a splice closure for optical ribbon fiber cable using the tray according to the present invention can be minimized, and an operator can dispose and repair the splice closure easily.

Furthermore, a degree of a reliance for the splice point of the optical fiber can be improved, and a cost for constructing the optical telecommunication lines can be reduced.

It should be understood that the present invention is not limited to the particular embodiment disclosed herein as the best mode contemplated for carrying out the present invention and is not limited to the specific embodiment described in this specification except as defined in the appended claims.

What is claimed is:

1. A tray for splicing optical ribbon fibers comprising:
   a tray main body having a plurality of supporting portions protruded on an outer side thereof;
   a plurality of inlet portions which provide inlet paths for protection tubes, each of the inlet portions to stack another tray main body on the tray main body;
   a plurality of splice arrangement plates which organize optical ribbon fibers, each of the splice arrangement plates being disposed on said tray main body;
   a number of organizing portions which fix the optical ribbon fibers and arrange excess lengths of the optical ribbon fibers, each of the splice arrangement plates comprising a plurality of the organizing portions; and
   a plurality of covers which cover the splice arrangement plates, respectively.

2. The tray as recited in claim 1, wherein the tray main body comprises a plurality of guide bars which guide the protection tubes.

3. The tray as recited in claim 1, wherein the tray main body comprises a plurality of protrusions which prevent the protection tubes from being removed outward.

4. The tray is recited in claim 1, wherein the tray main body comprises:
- a plurality of main body hooks on an upper surface thereof;
- a plurality of recesses which fit the main body hooks on a lower surface thereof; and
- a plurality of hook handles which remove the main body hooks from the recesses.

5. The tray as recited in claim 1, wherein the tray main body comprises a stopper which limits rotation of a stacking bar.

6. The tray as recited in claim 1, wherein the tray main body comprises a plurality of body fixing portions which fix the tray main body to outer housing of a splice closure.

7. The tray as recited in claim 1, wherein each of the inlet portions comprise a separator which includes an inlet path into two sections.

8. The tray as recited in claim 1, wherein each of the inlet portions comprises a buckle which fastens one of the protection tubes to prevent the one protection tube from being removed outward.

9. The tray as recited in claim 1, wherein the tray main body comprises a plurality of claws; and
- each of the splice arrangement plates comprises an extended portion fitted to the a corresponding one of the claws so that the splice arrangement plage is rotatable.

10. The tray as recited in claim 1, wherein each of the splice arrangement plates is arranged to keep a predetermined angle against a bottom surface of the tray main body.

11. The tray as recited in claim 1, wherein each of the organizing portions comprises:
- a retaining portion which fixes the splice; and
- an excess length arranging portion which arranges and stores the excess length of the optical ribbon fibers.

12. The tray as recited in claim 11, wherein the retaining portion comprises:
- a bendable bow-shaped plate; and
- a wall positioned in front of the bendable bow-shaped plage, wherein the splice is fitted between the bendable bow-shaped plate and the wall.

13. The tray as recited in claim 12, wherein the wall comprises a protruded portion which prevents the excess length stored in the excess length arranging portion from being removed outward.

14. The tray as recited in claim 1, wherein each of the splice arrangement plates comprises a cover rotation portion and a corresponding one of the covers comprises a cover hinge fitted to the cover rotation portion so that the corresponding cover is rotatable.

15. The tray as recited in claim 1, wherein each of the splice arrangement plates comprises a projection on a lower surface thereof and a corresponding one of the covers comprises a cover hook latched onto the projection, so that the corresponding cover covers a corresponding one of the organizing portions.

* * * * *